United States Patent
Fukuoka

[15] 3,698,107
[45] Oct. 17, 1972

[54] FOOTWEAR

[72] Inventor: Tatsuo Fukuoka, 3,3-Ban, 2-chome, Shin-Minami, Tokushima, Japan

[22] Filed: Feb. 12, 1971

[21] Appl. No.: 114,844

[30] Foreign Application Priority Data

Oct. 19, 1970 Japan ..................45/104050
Nov. 12, 1970 Japan ..................45/112294

[52] U.S. Cl. ..................................................36/11.5
[51] Int. Cl. .............................................A43b 3/12
[58] Field of Search ......................36/2.5 R, 11.5

[56] References Cited

UNITED STATES PATENTS

| 2,507,120 | 5/1950 | Shapiro | 36/11.5 |
| 2,744,340 | 5/1956 | Gerber | 36/11.5 |
| 3,552,039 | 1/1971 | Fukuoka | 36/11.5 |

*Primary Examiner*—Patrick D. Lawson
*Attorney*—Dawson, Tilton, Fallon & Lungmus

[57] ABSTRACT

A footwear comprises a sole provided with a foamed inner layer therein and a non-foamy outer layer integrally surrounding said foamed inner layer, a shape preservative fixture for an instep cover member being protruded integrally from the required edge portion of said sole, the foamed inner layer and non-foamy outer layer of said fixture being respectively and integrally connected with the foamed inner layer and non-foamy outer layer of the sole and the fitting portion of the instep cover member being affixed removably or firmly to the shape preservative fixture.

9 Claims, 25 Drawing Figures

FOOTWEAR

The present invention relates to a footwear and especially the footwear provided with a shape preservative fixture for an instep cover member being protruded integrally from a sole, the fitting portion of said instep cover member being affixed removably or firmly to said shape preservative fixture.

It was disclosed in the Japanese Utility Model Publication No. 18549/69 a technique for producing sturdy and light weight yet extremely comfortable-to-wear sandal integrally molded and formed with thermosetting synthetic resin material in about one operation and in a very short time, however, as to this kind of sandals and conventional shoes and other footwears, it was impossible to have such kind of instep covering member like bands, strips, straps and others which comprise with the wearers' high class taste and to provide therewith various designs, to the same sole member.

And, the aforesaid shortcomings are owing to an evil of mass production. However, it is difficult to obtain footwears applied with various designs, that is, handmade high class footwears by mass production, and, even in case an improved mass producing method is adapted, if a number of hand works are included in the process, it rather raises the production costs and retail prices of the finished goods, which forces the general consumers' unnecessary expenditure as a result.

The inventor has had several hard works to solve the above-mentioned problem and, as a result, has succeeded in developing the invented footwears after experiencing many failures.

The invented footwears, although are possible to be manufactured by mass production, are given varieties thereupon, and the instep covering members thereof are representable of casual-like and other various designs in order to express the wearers' individuality and other high class designs suitable for high quality footwears. Further, the consolidated state between the instep covering member and the sole is being made more sturdy thereby the instep covering member is undetachable from the sole even after a long use of the footwear. Further, the instep covering member is freely selective against a sole to which it is to be attached in the process of the production of the footwears, and the scope of selection can be extremely enlargened. That is, a variety of the instep covering members, all different in their designs, shapes, constructions and others are being prepared which are optionally attachable to the soles in accordance with the objects thereof.

To sum up, in conventional sandals, shoes and other footwears, particularly in footwears wherein the instep covering members such as bands, straps and others are integrally molded with the footwears' sole, it was not possible to have a more tough material of instep covering members such as bands, straps and others as against that of soles, or to have instep covering members rich of designs, or to have them in expensive materials such as natural leather and others, or to have them in so-called separate style with buckles attached to the instep covering members. However, the invented footwears are completely fulfilling the afore-mentioned requirements.

Specially, it is difficult to harmonize design-wise a naturally design lacking and monotonous sole with instep cover member having remarkable design, however, in the instance of the invented footwears it is possible to harmonize design-wise the instep cover member having remarkable design with the sole due to the interposition of the shape preservative fixture incorporated with the sole and to which the instep cover member is being attached, particularly, due to the interposition of this shape preservative fixture intermediately between the sole and the instep cover member and which form having been constructed so as to suit the instep cover member. Further, this shape preservative fixture itself is capable of providing designing effects to the footwears depending on the forms and others of the fixture. Furthermore, in case of the invented footwears, the connecting portion of sole and instep cover member is being placed at a higher position as compared to that of the conventional footwears. This is because the instep cover member is not directly attached to the sole but because the shape preservative fixture is being interposed between the sole and the instep cover member. Therefore, usually in footwears the connecting portion is easily spoiled due to submersion or other reasons, thus the defect such as detachment of instep cover member from sole will occur, but in case of the invented footwears, since the connecting portion is being placed at a higher position than that of the conventional footwears, the spoiling degree due to submersion and other reasons is greatly reduced which means a prevention of dissociation of the connecting portion.

And, in sandals which construction was to secure both ends of the bands directly to the soles, there was an important defect wherein bands easily detached from soles as the connecting portion between bands and soles was constantly bearing a load and, particularly when users stagger when walking, a sudden shock was given to this portion which resulted in disconnection of bands from soles. This was the same in shoes, therefore it was especially necessary to reinforce the connecting portion between instep cover and sole. However, in case of the invented footwears, the instep cover members such as bands and straps are being fitted to the soles by means of the shape preservative fixture, therefore naturally the position where the cover member is attached to the sole is relatively high and user's load and shock will not be given to the connecting portion of the instep cover member and sole but to the shape preservative fixture embodied with the sole. Another reason for avoiding the load and shock by the connecting portion is the construction of the footwear wherein the shape preservative fixture is being built integrally from the sole of which the inside is formed of foamed inner layer and outside of non-foamy outer layer and, while inside of this shape preservative fixture is formed of foamed inner layer integrally with the aforesaid foamed inner layer of the sole, the outside of the fixture is formed of non-foamy outer layer integrally with the non-foamy outer layer of the sole.

The shape preservative fixture integrally formed with the sole can well withstand not only a load but a sudden shock however big it can be. That is, because of the intervention of the foamed inner layer inside the shape preservative fixture, the fixture functions so as to enable elastically the shock absorption and, since the foamed inner layer inside the shape preservative fixture is integrally formed with the foamed inner layer inside the sole, the shock added to the shape preservative fixture will be scattered about throughout the sole due to the existence of the integrally formed ventilating foamed inner layer inside thereof.

In this way, the shape preservative fixture is being made so as to constantly and mainly receive the load and shock, is functioned so as to scatter about the shock, eventually the entire sole will receive the shock or load and, since the entire sole is being integrally molded in a construction of foamed inner layer and non-foamy outer layer, the shape preservative fixture and sole of the invented footwears are fully ensured of durability and shock-proof thereof. Further, even after a long use, the integrally intervening non-foamy outer layer outside the surface of the shape preservative fixture and the sole is protecting the foamed inner layer from deformation and this shape preservative effect is also ensured due to the integration of the foamed inner layer and non-foamy outer layer. For instance, when a shock is added to the shape preservative fixture, the shape preservative fixture and the sole will be deformed on account of scatter of the shock, however after the shock is gone, the non-foamy outer layer will function well enough to restore the original forms of the shape preservative fixture and the sole. In other words, dual effects of the shape preservation, that is, the resilient deformation of the foamed layers of the shape preservative fixture and the sole, and the restoration of the original form by the non-foamy layer integrated with the foamy layer are organically performed for obtaining shock-proof.

Particularly, the technique of fitting the instep cover members such as bands, straps and others in a required form (a form to provide the user a better comfort-to-wear and a nice external appearance) to the sole and maintaining this preferred form in the instep cover member after being fitted to the sole is considered to be difficult, therefore, a special producing mold and other special appliances were conventionally necessitated in the process of manufacturing sandals and shoes. However, the said invention does not require the use of any such special appliances as mentioned above for attaching the comfortable-to-wear and nice looking instep cover member very easily to the sole and maintaining this ideal shape in the instep cover member after production and specially for a long time use thereafter. This is because the instep cover member of the invented footwears is not attached directly to the sole. That is, the instep cover member is attached to the sole by means of the shape preservative fixture built integrally with and from the sole and, since this shape preservative fixture is integrally molded simultaneously with the integral formation of the sole in the mold, the shape preservative fixture itself is always formed definitely in the required form and the form of the instep cover member is controllable in accordance with the form of the shape preservative fixture at the time of attachment as the instep cover member is attached to the shape preservative fixture which is shaped exactly in the desired form. Further, after the instep cover member is attached indirectly to the sole in the exactly desired form, even if the instep cover member is tend to change the required shape thereof after a long use or due to shock, the said shape preservative fixture will not allow such deformation.

This can be understood by the fact that the instep cover members such as bands, straps and others are attached to the soles by means of the shape preservative fixtures through the method for indirect attachment as against the method for direct attachment wherein instep cover members are being directly attached to soles, so that form adjustment and others are favorably allowable during work of the fixtures in order to provide the instep cover members the desired form, a comfort to-wear and preferred external appearance as against the soles of desired form.

Furthermore, since the non-foamy outer layer existing in the outer surface of the shape preservative fixture is always performing shape preserving effect in cooperation with the material thereof, it shows definitely the functions thereof in the event of deformation prevention of the instep cover members.

In addition, on account of the imposition of the shape preservative fixture between the sole and the instep cover member, it is possible to reduce the material of the instep cover member equivalent to the area of the shape preservative fixture. This has a specially important meaning when an expensive natural leather is being used for the instep cover member.

The invented sole is integrally molded with thermosetting synthetic resins material. And the inner portion of the sole is vesicated by means of the required vesicant molding means either containing or not containing vesicant thus forming a foamed inner layer, the visible or invisible non-foamy outer layer being formed continuously with the said foamed layer is further formed, and the cross-sectional view of this vesicated foamy layer shows that the average particle diameter of the bubbles is successively growing larger from the surface towards the center throughout the non-foamy outer layer and the foamed layer. In some cases, though, the average particle diameter of the bubbles is not successively growing larger. The user's sole contacting surface of the above mentioned sole is providing an uneven shape in order to closely conform to the profile of the user's sole.

Furthermore, the shape preservative fixtures are formed integrally in an upward protruding shape from the required edge of the sole. Therefore, the inner construction of the shape preservative fixture is completely identical with that of the aforesaid sole and is possessing the foamed and non-foamy layers continuously constructed with the foamed and non-foamy layers of the aforesaid sole. The instep cover member is constituted either absolutely of ventilative basic material or of the basic material combined with the designing material and the instep cover member is attached to the sole by means of the shape preservative fixture easily removably or firmly.

The following is the explanation of the subject invention according to the embodiments referred to in the attached drawings wherein.

Embodiment 1

Figure 1:
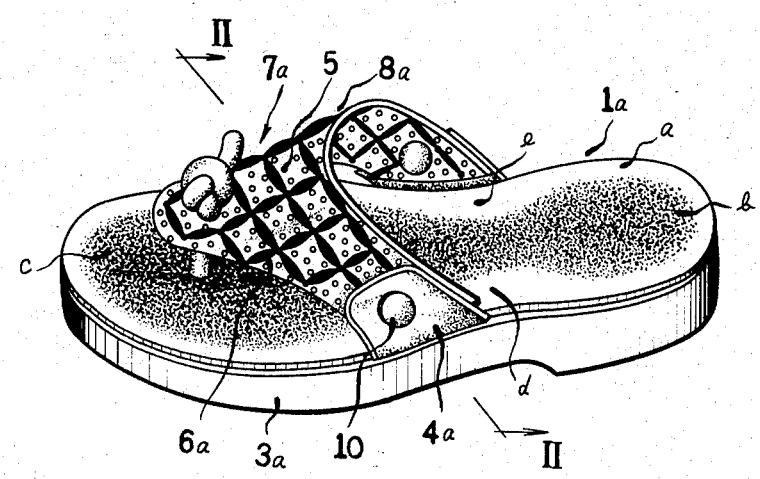
FIG. 1 is a perspective view of the first Embodiment of the invented footwear.
Figure 2:
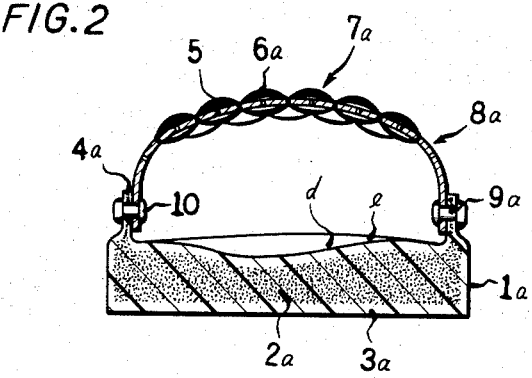
FIG. 2 is a cross-sectional view of FIG. 1 taken along the line II—II.

Sole 1a of the sandal shown in FIGS. 1 and 2 is being integrally molded with thermosetting synthetic resin material. This material is a mixture of, for instance, vinyl chloride, plasticizer, vesicant, stabilizer, lubricating material, coloring agent and others which is being molded by means of injection molding machine. There are several kinds of these molding methods, for instance, the method shown in the U.S. Letters Pat. No. 3058161. As to the manufacture of the invented footwears, reference is made to the method shown in the Japanese Pat. Pub. No. 22213/64. The inner composition of thus foamingly molded sole 1a is constituted of foamed inner layer 2a and non-foamy outer layer 3a. This foamed layer 2a is possessing a construction in its cross-section wherein the average particle diameter of the bubbles is successively growing larger from the surface towards the center of the foamed layer. And this inner foamed layer 2a and the visible or invisible non-foamy outer layer 3a of the surface layer surrounding the inner foamed layer are continuously constructed, and these are obviously distinguishable or indistinguishable from the external appearance thereof. Further, the non-foamy outer layer is in some cases in a state of thin film hard to be called a layer. The surface of the sole 1a, that is, the user's sole contacting surface is possessing a shape in order to closely or somewhat conform to the profile of the user's sole. The peripheral edge portion "a" of the sole is being raised all the way, the approximate center "b" of the heel is being recessed generously from this raised portion of the peripheral edge, this recession "b" is being continued from the approximate center of the heel up to the recessed toe portion "c" which is comparatively large and being recessed generously from the raised portion of the peripheral edge through the comparatively slender recessed channel "d" positioned slightly off the central portion, the shank portion "e" being raised generously from the aforesaid recessed channel "d" in combination with the raised portion of the peripheral edge and these raised portions and recessions are being integrally connected by means of a generously undulated surface. Furthermore, from the required edge portion of the sole 1a are being built upward one or more required numbers of shape preservative fixtures 4a and, since these are being built integrally from and with the sole, the inner composition of the shape preservative fixture is exactly the same as that of the sole and the foamed and non-foamy layers thereof are also integrally connected to the relative layers of the sole. On the other hand, the instep cover member 8a is being provided by boring many small holes on the basic material thereof as shown in FIGS. 1 and 2. The decorative portion 7a is being formed by inserting the required ornamental material 6 such as twisted, braided and other yarns to the plurality of small holes 5 from front and back sides, connecting each small hole with the yarn-like ornamental material 6, thus forming the decorative portion 7a on the front and back sides of the instep cover member 8a by means of optional yarn-like ornamental material.

Also, the basic material of the aforesaid instep cover member 8a can be provided in mesh wherein the same decorative portion as mentioned above can be formed.

Bore the holes 9a to the aforesaid shape preservative fixtures 4a, attach the ends of the instep cover member 8a to the shape preservative fixtures 4a through these holes by means of the binding accessories 10 either removably or firmly in compliance with the usage thereof.

Embodiment 2

Figure 3:
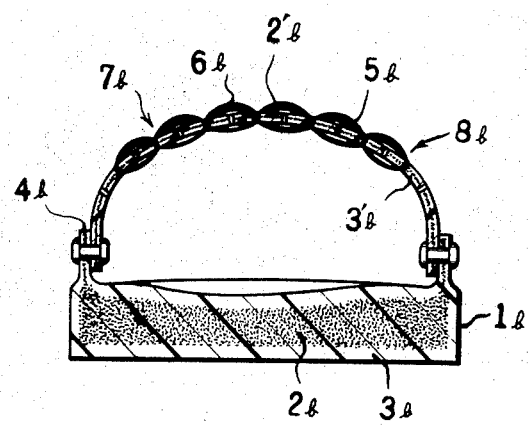
FIG. 3 is a cross-sectional view of the second Embodiment of the invented footwear.
Figure 4:
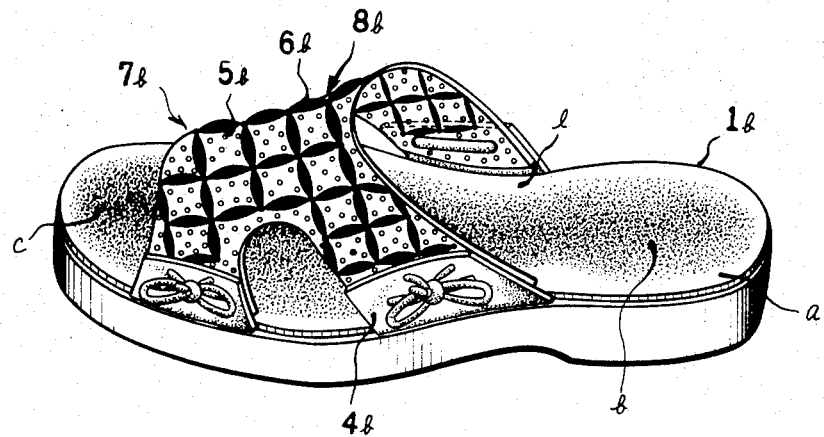
FIG. 4 is a perspective view of the third Embodiment of the invented footwear.

The footwear shown in FIGS. 3 and 4 is of the same composition as that under Embodiment 1 except that the basic material of the instep cover member 8b is possessing the foamed inner layer 2'b and non-foamy outer layer 3'b same as sole 1b. And this foamed layer 2'b and non-foamy layer 3'b are of completely identical construction with the layers 2a and 3a mentioned in Embodiment I.

Embodiment 3

Figure 5:
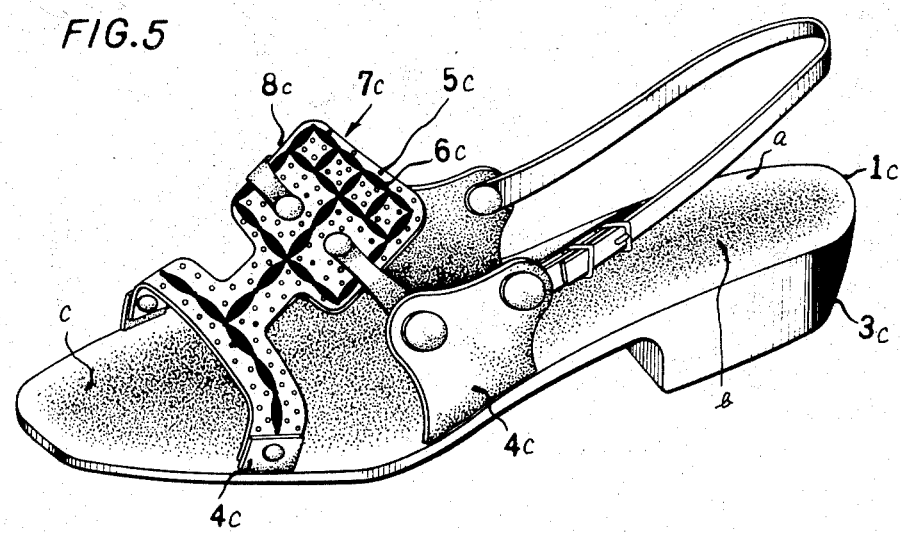
FIG. 5 is a perspective view of the fourth Embodiment of the invented footwear.

FIG. 5 is showing the footwear provided with the same construction as that of the footwear under Embodiment I, provided that the instep cover member thereof 8c provides its unique construction differed from that as shown in FIG. 1.

Embodiment 4

Figure 6:
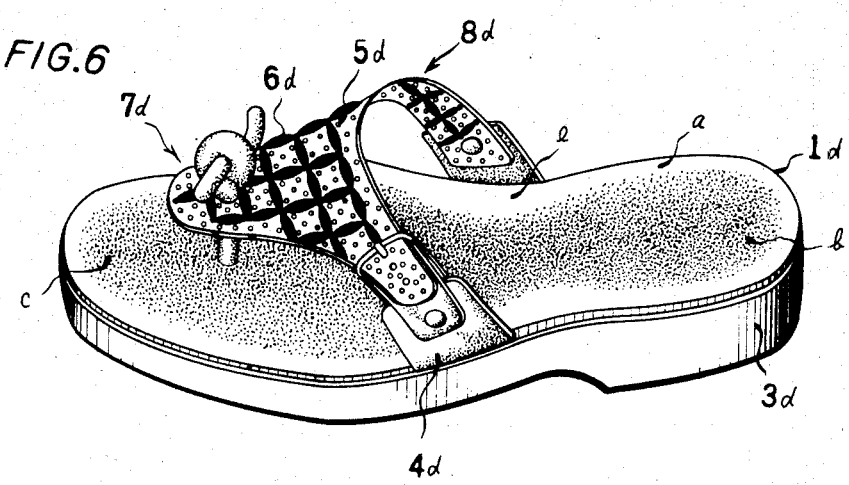
FIG. 6 is a perspective view of the fifth Embodiment of the invented footwear.

FIG. 6 is showing the footwear provided with the same construction as that of the footwear under Embodiment 2. However in this case, the instep cover member is being attached to the shape preservative fixture by means of buckle so as to afford the users easy wearing and taking off.

Figure 7:
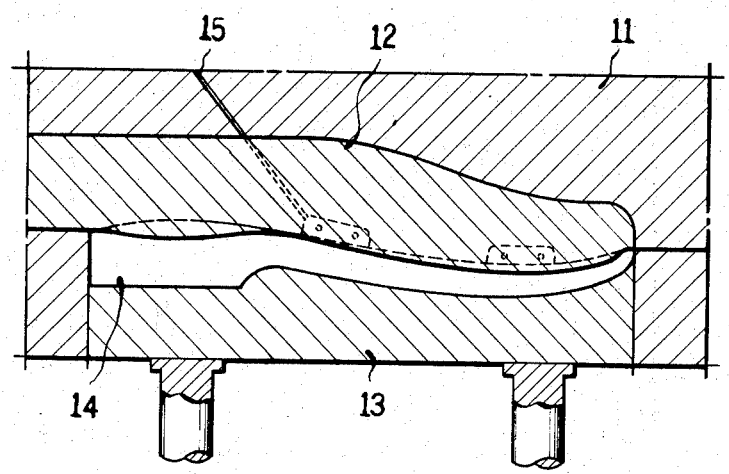
FIG. 7 is a longitudinal sectional view of the forming mold of the footwear shown in FIG. 4.
Figure 8:
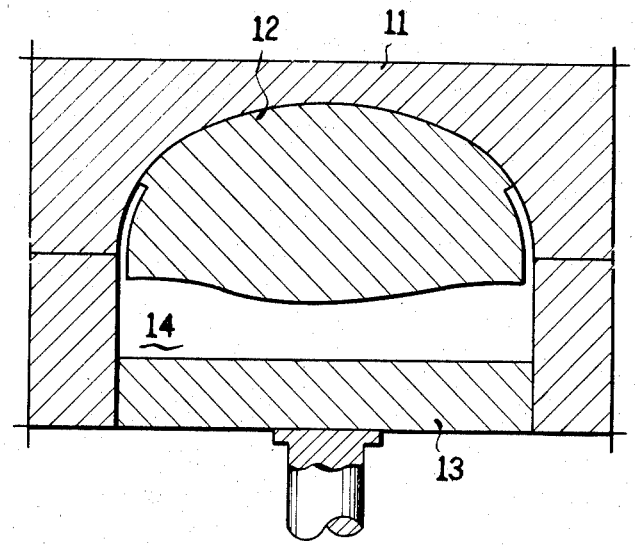
FIG. 8 is a cross-sectional views of the mold shown in FIG. 7.

Explanation is given herewith as to the mold for manufacturing the footwear shown in FIG. 1 by referring to FIGS. 7 and 8. Numeral 11 is the mold, numeral 12 is the back-and-forth movable core mold, numeral 13 is the up-and-down movable mold to enlarge or vary the capacity inside the cavity 14 at the time of vesicating and numeral 15 is the material injecting passage.

Embodiment 5

Figure 9:
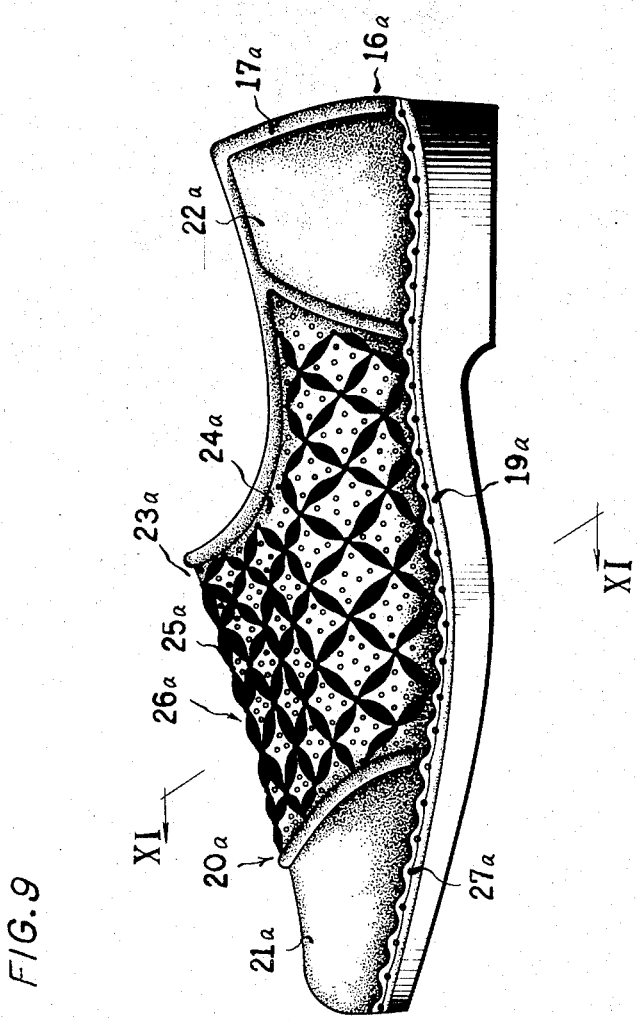
FIG. 9 is a perspective view of the sixth Embodiment of the invented footwear.
Figure 11:
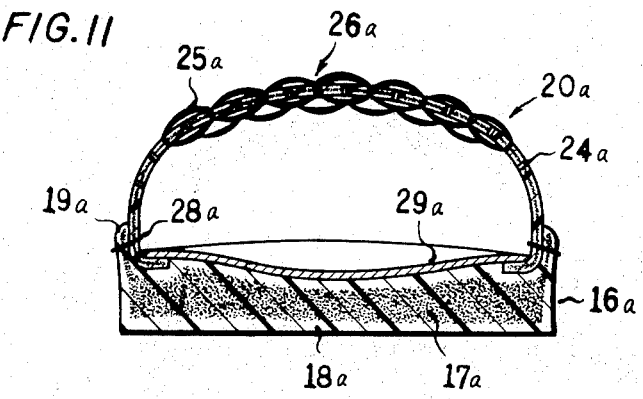
FIG. 11 is a cross-sectional view of FIG. 9 taken along the line XI—XI.

The sole 16a of the footwear (shoes in this instance) shown in FIGS. 9 and 11 is being integrally molded of thermosetting synthetic resins material. This molding method is exactly the same as in the case of Embodiment I which is also shown, for instance, in the U.S. Letters Pat. No. 3058161.

This sole 16a is being provided with the foamed inner layer 17a is being provided with the foamed inner layer 17a and non-foamy outer layer 18a identical with Embodiment I and the point relative to the continuous composition of the average particle diameter of the bubbles is also the same as in Embodiment I.

The surface namely the user's sole contacting surface of this sole 16a is being formed completely identical with that in case of Embodiment I. Further, like in case of Embodiment I, the shape preservative fixture 19a is being built upward from the required elevated edge portion of the sole. The instep cover member 20a, that is, the instep strap is being provided with the reinforcing portions 21a and 22a at its toe cover portion and heel cover portion respectively, and each of the reinforcing portion is being formed of tough materials such as natural leather, synthetic leather, strong cloth material, hard synthetic resinous material and others. The basic material being used for the instep cover middle portion 23a existing between the two reinforcing portions 21a and 22a is either being bored with a plurality of small holes 24a or provided with mesh construction. These small holes 24a are being connected by means of the required ornamental materials 25a such as twisted yarns, braids and others from front and back sides thus forming the decorated portion 26a on the front and back surfaces of the basic material of the instep cover middle portion.

The upper edge portion of the aforesaid shape preservative fixture 19a is being scalloped and a plurality of decorative small pits 27a are being provided at this upper edge portion each of them spaced apart from the others. A plurality of small pits are being provided at the lower edge portion of the aforesaid instep cover member 20a each of them spaced apart from the others and these small pits are being provided at the positions corresponding to the small pits so that the lower edge portion of the member 20a will be connected correctly to the aforesaid shape preservative fixture 19a at their predetermined connecting positions when connection is to be made.

The lower edge portion of the aforesaid member 20a is being connected to the inner side of the aforesaid shape preservative fixture 19a by means of the aforesaid corresponding small pits at the predetermined connecting positions and they are being firmly connected by means of binding agent, heat sealing or sewing machine stitching.

Also, there is another case wherein the aforesaid small holes 27a and 28a are being substituted with small pits and these corresponding small holes are being sewn together successively by means of linking materials such as strengthened stitching yarn made of strong synthetic resinous material or other suitable materials or others so that the lower edge portion of the member 20a is firmly connected with the shape preservative fixture 19a. Bonding agent may also be used in this case to connect them.

And, usually the shape preservative fixture 19a and the lower edge portion of the aforesaid member 20a are being connected by stitching successively the aforesaid corresponding small holes by means of linking materials such as specially tough strengthened stitching yarn and others, however, it is also possible in this case to attach newly another instep cover member preferred by the user to the sole 16a by extracting the former connecting stitched yarn from this connected portion, replacing the instep cover member 20a being connected to the sole 16a with the new cover member 20a and connecting the lower edge portion of the new cover member to the shape preservative fixture 19a by means of stitching yarn. The aforesaid middle portion 23a is being formed either integrally with or separately from the two reinforcing portions 21a and 22a, and in the latter case, the middle portion 23a is being fixed to the two reinforcing portions removably or firmly by means of the required connecting means in accordance with the method shown in Embodiment 6. Numeral 29a in FIG. 11 represents a thin sheet or film.

Embodiment 6

Figure 10:
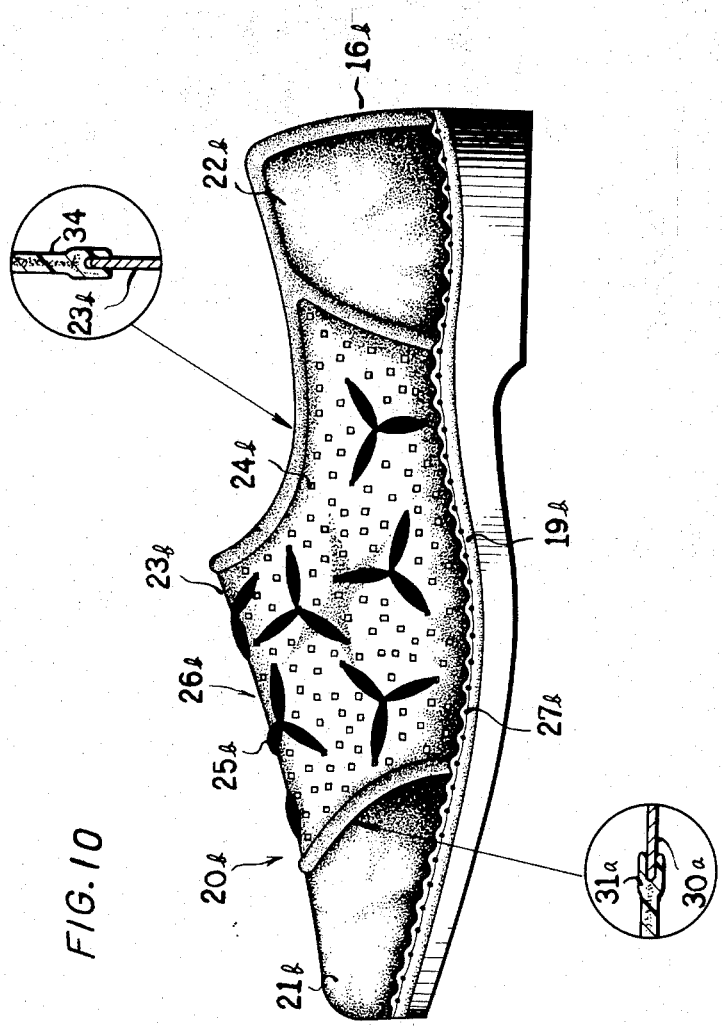
FIG. 10 is a perspective view of the seventh Embodiment of the invented footwear.
Figure 12:
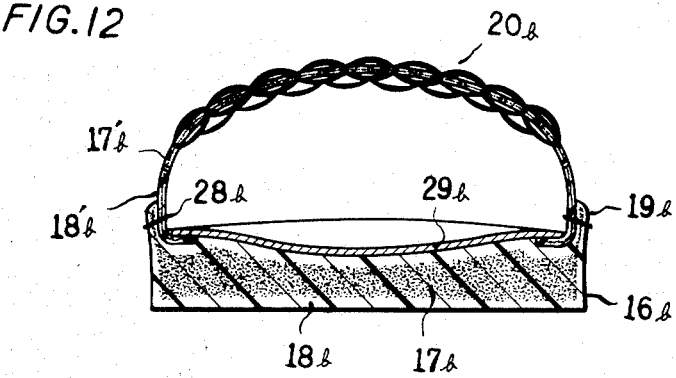
FIG. 12 is a cross-sectional view of the eighth Embodiment of the invented footwear.
Figure 13:
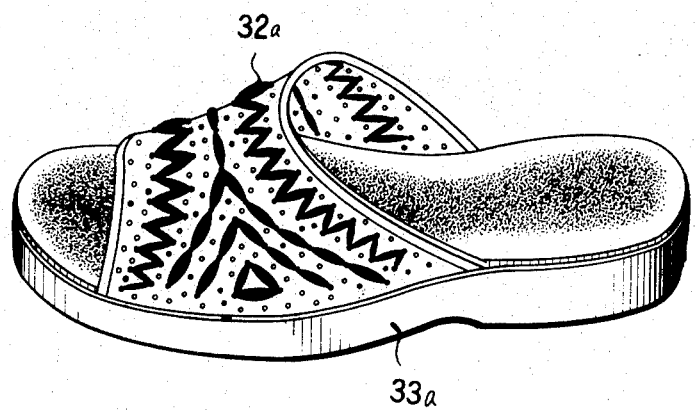
FIG. 13 is a perspective view of the ninth Embodiment of the invented footwear.
Figure 15:
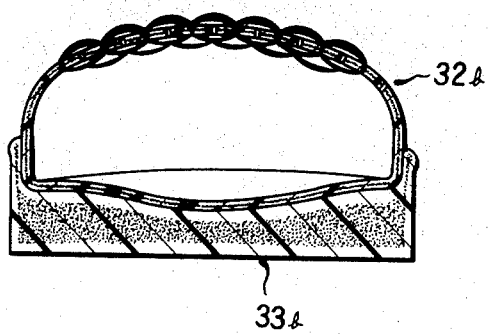
FIG. 15 is a cross-sectional view of the eleventh Embodiment of the invented footwear.
Figure 16:
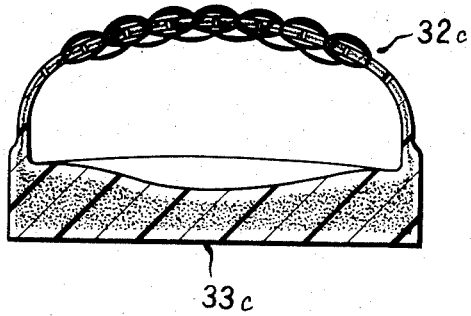
FIG. 16 is a cross-sectional view of the twelfth Embodiment of the invented footwear.

The shoes shown in FIGS. 10 and 12 are being provided with sole 16b, foamed inner layer 17b, non-foamy outer layer 18b shape preservative fixture 19b, instep cover member 20b, and reinforcing portions 21b and 22b formed completely in the same way as in case of Embodiment 5. However in this embodiment, unlike in case of Embodiment 5, the instep cover middle portion 23b existing in between the two reinforcing portions 21b and 22b is being formed in the same way as the sole 16b, that is, is possessing foamed inner layer 17'b and non-foamy outer layer 18'b, and the cross section of the foamed layer of the inner portion shows that the average particle diameter of bubbles are consecutively growing larger from the surface to the central portion throughout the non-foamy layer and foamed layer. In some cases the particle diameter is not growing large. This middle portion 23b is either possessing a plurality of small holes or is being constructed by mesh like basic material. A large number of these small holes are being linked from front and back sides by passing through these holes the required ornamental materials such as twisted yarns, braided yarns and others thus forming the decorated portion on the front and back sides of the middle portion 23b by means of optional ornamental material. The aforesaid middle portion 23b is being fixed to the two reinforcing portions 21b and 22b either removably or firmly by inserting or by means of bonding agent and others the relative corresponding edge portions 30a of the m case) shown in FIGS. 13,15 and 16 are approximately the same in their constructions as the sandal shown in Embodiment I, however, in case of FIG. 13 the two end edges of the instep cover member 32 are being firmly fixed to the required portion of the sole 33, in case of FIG. 15 the lower edge portion of the instep cover member 32b is being firmly fixed to the sole 33b and in case of FIG. 16 the instep cover member 32c is being integrally formed with the sole 33c.

Embodiment 8

Figure 14:
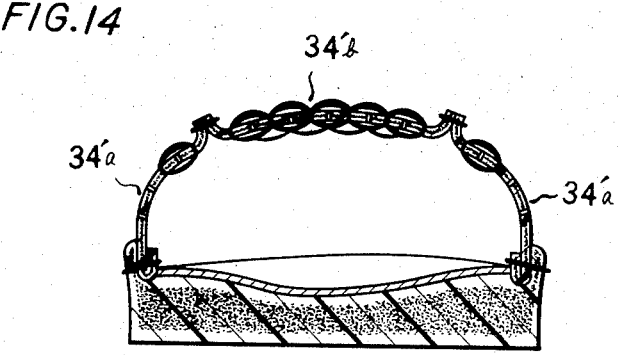
FIG. 14 is a cross-sectional view of the tenth Embodiment of the invented footwear.

Explanation is given herewith as to the footwear (shoes in this case) shown in FIG. 14. This shoes have the same construction as that shown in FIG. 9 except that the construction of the instep cover member 34 is different from that of the shoes under FIG. 9.

That is, the said member is being constituted of side essential elements 34'a and 34'a and upper essential element 34'b, each essential element being linked with the required linking means as shown in the drawing.

Embodiment 9

Figure 17:
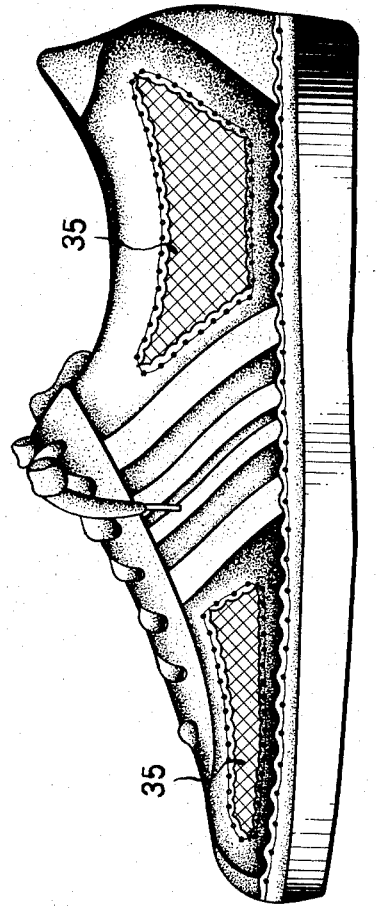
FIG. 17 is a perspective view of the thirteenth Embodiment of the invented footwear.

The footwear (shoe in this case) shown in FIG. 17 has nearly the same construction as that shown in FIG. 9, however, the design of the instep cover member under FIG. 17 is different from that under FIG. 9. That is, the decorative parts 35 design-wise different from that of FIG. 9 are being provided at the front and back of both flanks of the shoe.

Embodiment 10

Figure 18:
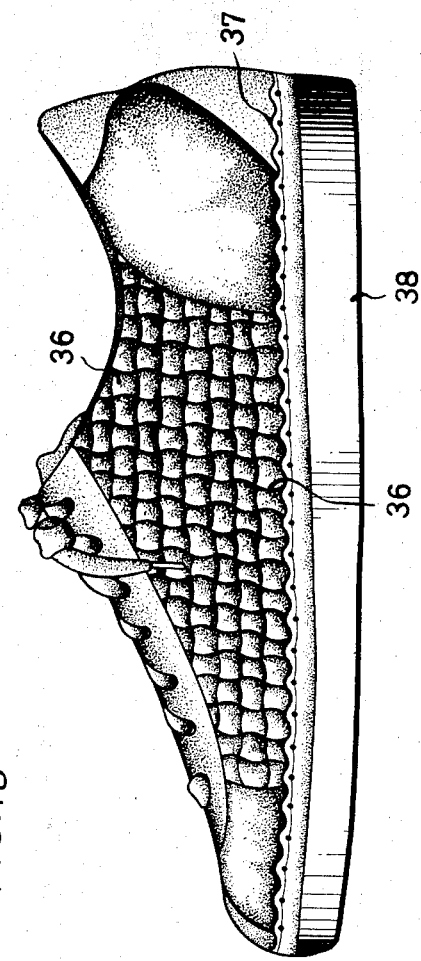
FIG. 18 is a perspective view of the fourteenth Embodiment of the invented footwear.

The shoe shown in FIG. 18 is almost the same as to the construction with that of the shoe shown in FIG. 9 with the exception of the following points:
1. The design of the instep cover member 36 is different.
2. The lower edge portion of the instep cover member 36 is being firmly fixed to the instep cover member fixture 37 of the sole 38.

Embodiment 11

Figure 19:
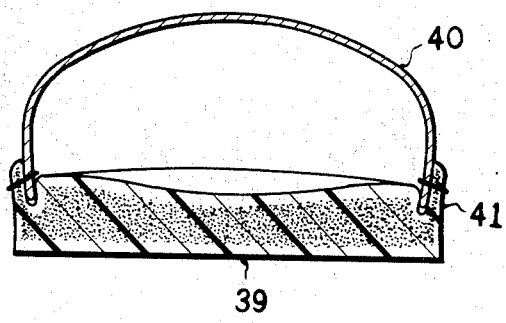
FIG. 19 is a cross-sectional view of the eleventh Embodiment of the invented footwear.

FIG. 19 shows the cross-sectional view of the invented shoe. Numeral 39 represents the sole, 40 the instep cover and 41 the shape preservative fixture. The construction thereof is identical with that of the shoes shown in FIG. 18 with the exception of the following points:
1. The cover member has no design.
2. The cover member 40 is being firmly fixed to the sole 39 by means of the shape preservative fixture 41.

Embodiment 12

Figure 20:
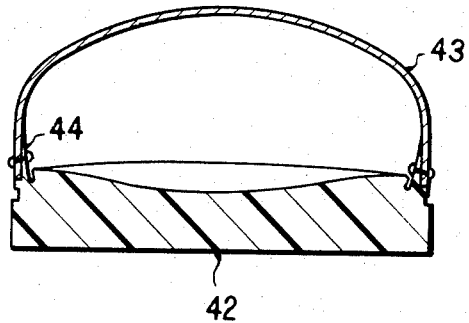
FIG. 20 is a cross-sectional view of the twelfth Embodiment of the invented footwear.

In case of FIG. 20, the sole 42 is being formed of required thermosetting synthetic resins material or other materials suitable for soles, however, it is not being vesicated. Numeral 43 is either band or instep cover and numeral 44 is shape preservative fixture. With the exception of the aforesaid sole 42, the rest of the construction is identical with that shown in FIG. 19.

Embodiment 13

Figure 21:
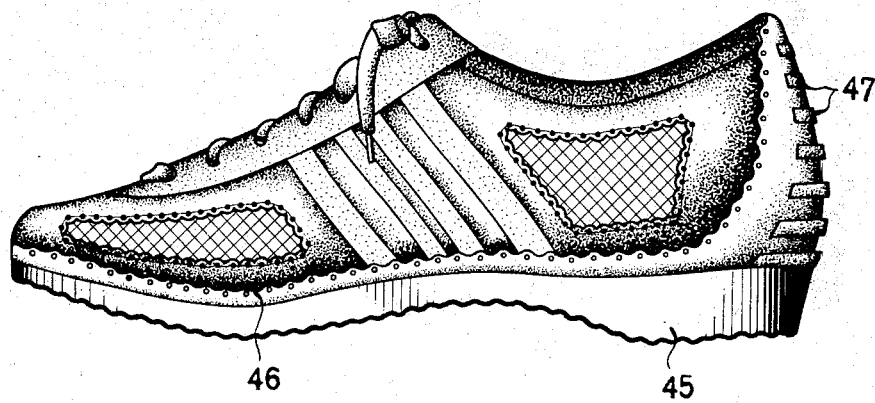
FIG. 21 is a perspective view of the thirteenth Embodiment of the invented footwear.

FIG. 21 shows the shoe sole 45 and the shape preservative fixture 46 being built upward integrally with and from the sole. Numeral 47 shows the non-skid protuberances being built from the heel. The required instep cover is being attached to this sole by means of the shape preservative fixture 46.

The constructions of the sole and the shape preservative portion 46 are the same with those shown in FIG. 18.

Embodiment 14

Figure 22:
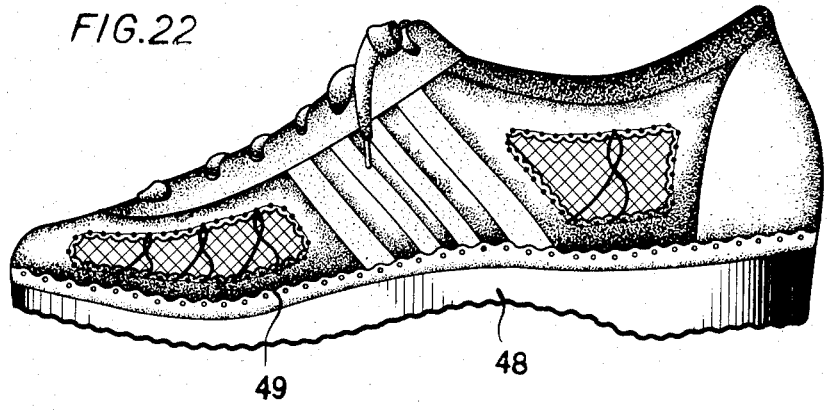
FIG. 22 is a perspective view of the fourteenth Embodiment of the invented footwear.

FIG. 22 shows the shoe sole 48 and the instep cover member 49 being built integrally with and from the sole. However, unlike Embodiment 13 the shoe is not provided with the protuberances. The constructions of the sole and the shape preservative portion are identical with those shown in FIG. 18.

Embodiment 15

Figure 23:
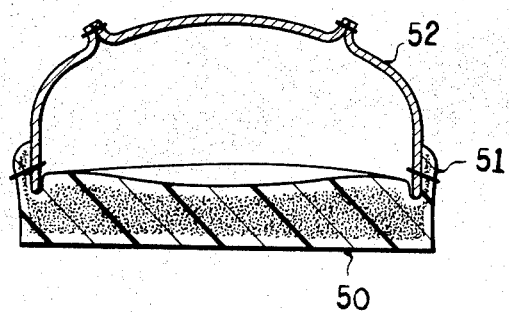
FIG. 23 is a cross-sectional view of the fifteenth Embodiment of the invented footwear.

FIG. 23 shows the cross-sectional view of the invented shoe which are being provided with the sole 50 and shape preservative fixture 51 being built integrally with and from the sole. The end edges of the instep cover 52 are being firmly affixed to the shape preservative portion 51. With the exception of the point wherein the instep cover is being constituted of three divided portions, the construction of the shoes in the same as that shown in FIG. 18.

Embodiment 16

Figure 24:
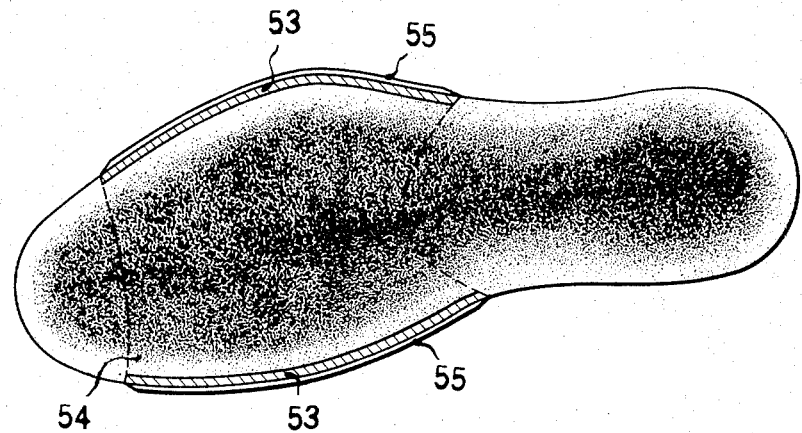
FIG. 24 is a plane view of the sixteenth Embodiment of the invented footwear in which main portion of the instep cover member is cut off.

FIG. 24 shows the plane diagram of the invented sandal wherein the main portion of the band is being cut off.

This is to explain that attachment of the band 53 to sole 54 in the required form is easily feasible by means of the shape preservative fixture 55, and to show that the arc-shape of the cross section of the band is difficult to obtain without the help of the shape preservative portion 55.

Embodiment 17

Figure 25:
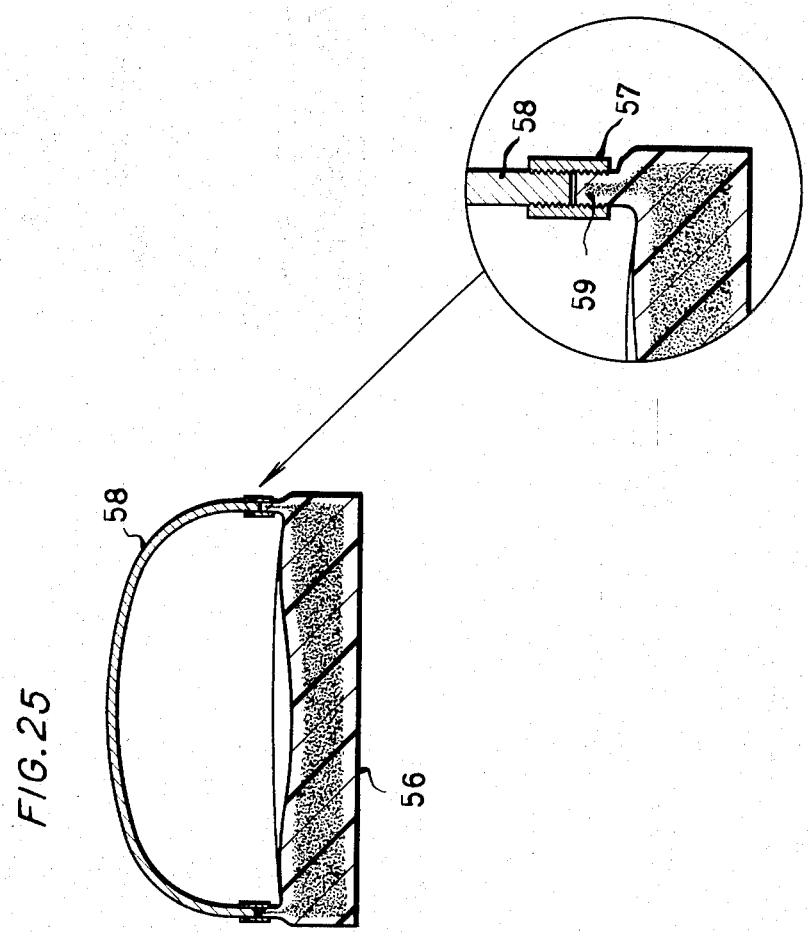
FIG. 25 is a cross-sectional view of the seventeenth Embodiment of the invented footwear.

FIG. 25 shows the invented sole 56 wherein the particular means 57 such as metal fittings and others are being used when instep cover member 58 is being attached to the shape preservative fixture 59.

What I claim is:

1. A footwear comprising a sole provided with a foamed inner layer made of thermoplastic material and a non-foamy outer layer integrally surrounding said foamed layer, at least one shape preservative fixture for an instep cover member having a foamed inner layer and a non-foamy outer layer being built integrally with and from the required edge portion of said sole, the foamed layer and the non-foamy layer of said fixture being respectively and integrally connected with the foamed and non-foamy layers of the sole, and the edge portion of the instep cover member being attached to the shape preservative fixture.

2. A footwear as claimed in claim 1, in which the foamed inner layer has a construction in its cross-section wherein the average diameter of the bubbles is successively growing larger from the surface thereof towards the center thereof.

3. A footwear as claimed in claim 1, wherein the surface of the sole is uneven in comformity with the profile of the user's sole.

4. A footwear as claimed in claim 1, wherein the instep cover member provides a decorative portion consisted of penetrating holes and ornamental material inserted thereinto.

5. A footwear as claimed in claim 1, wherein the foamed inner layer and non-foamy outer layer of the shape preservative fixture are integrally connected to the foamed inner layer and non-foamy outer layer of the sole, respectively.

6. A footwear as claimed in claim 1, wherein the basic material of the instep cover member is provided with a foamed inner layer and non-foamy outer layer integrally connected to each other.

7. A footwear as claimed in claim 1, wherein the instep cover member is provided with at least a reinforcing portion.

8. A footwear as claimed in claim 1, wherein the lower edge portion of the instep cover member is connected to inner or outer side of the shape preservative fixture while small pits on said lower edge portion of the instep cover member face pits of the shape preservative fixture.

9. A footwear as claimed in claim 1, wherein small holes of lower edge portion of the instep cover member face small holes of the shape preservative fixture.

* * * * *